(12) United States Patent
Godwin et al.

(10) Patent No.: US 7,629,413 B2
(45) Date of Patent: Dec. 8, 2009

(54) PLASTICISER COMPOSITIONS

(75) Inventors: Allen David Godwin, Seabrook, TX (US); Didier Naert, Brussels (BE)

(73) Assignee: Exxonmobil Chemical Patents Inc., Houston, TX (US)

( * ) Notice: Subject to any disclaimer, the term of this patent is extended or adjusted under 35 U.S.C. 154(b) by 45 days.

(21) Appl. No.: 11/792,034

(22) PCT Filed: Jan. 18, 2006

(86) PCT No.: PCT/EP2006/000478

§ 371 (c)(1),
(2), (4) Date: May 31, 2007

(87) PCT Pub. No.: WO2006/077131

PCT Pub. Date: Jul. 27, 2006

(65) Prior Publication Data

US 2008/0234414 A1 Sep. 25, 2008

Related U.S. Application Data

(60) Provisional application No. 60/645,161, filed on Jan. 18, 2005.

(51) Int. Cl.
*C08L 27/00* (2006.01)
*A61K 9/16* (2006.01)
*B32B 9/04* (2006.01)

(52) U.S. Cl. ............... 524/569; 524/285; 524/112; 524/567; 524/543; 524/292; 428/411.1

(58) Field of Classification Search ............... 524/285, 524/569, 112, 567, 543, 292; 428/518, 520, 428/522, 411.1
See application file for complete search history.

(56) References Cited

U.S. PATENT DOCUMENTS

| 5,236,987 A | 8/1993 | Arendt | 524/287 |
| 2004/0015007 A1* | 1/2004 | Grass et al. | 560/103 |
| 2004/0138358 A1* | 7/2004 | Koch et al. | 524/297 |
| 2004/0204522 A1* | 10/2004 | Austen et al. | 524/99 |

FOREIGN PATENT DOCUMENTS

| EP | 1 415 978 | 6/2004 |
| FR | 2 026 170 | 9/1970 |
| WO | WO 97/39060 | 10/1997 |
| WO | WO 03029339 | * 4/2003 |

OTHER PUBLICATIONS

Arendt et al., "Trimethylpentanediol Dibenzoate: New Plasticizer for Plastisol Screen Ink," Reprinted from Journal of Vinyl Technology, Mar. 1994, vol. 16, No. 1, pp. 51-56.
Velsicol Chemical Corporation, "Benzoflex® 131," Product Information Bulletin, pp. 1-3.

* cited by examiner

*Primary Examiner*—Vasu Jagannathan
*Assistant Examiner*—Alexander C Kollias
(74) *Attorney, Agent, or Firm*—Andrew B. Griffis; Leandro Arechederra, III

(57) ABSTRACT

$C_9$ to $C_{11}$ alkyl benzoates are used as plasticisers for polyvinyl chloride in particular in combination with plasticisers such as di-2-ethyl hexyl phthalate, diisononyl phthalate, di-2-propyl heptyl phthalate, diisodecyl phthalate or di-2-ethyl hexyl terephthalate. The use of the $C_9$ to $C_{11}$ alkyl benzoates provides low viscosity low volatility plasticisers, which are fast fusing with lower hot bench gelation temperature and which can be used to reduce the staining problems associated with use of di-2-ethyl hexyl phthalate and diisononyl phthalate. The low viscosity of the $C_9$ to $C_{11}$ alkyl benzoates allows the formulation of solvent free flexible PVC formulations meeting stringent VOC limitations.

16 Claims, 9 Drawing Sheets

Emission spectra of REF formulation

Emission spectra of V1 formulation

Emission spectra of V3 formulation

Emission spectra of V2 formulation

Emission spectra of V4 formulation

Fig. 7

| | F0 J77/B 2088 37/13 | F1 Benzoflex 2088 5 | F2 J77 50 | F3 J77 45 | F4 B 2088/DINP 30/20 | F5 DINP/BBP 10/40 | F6 DINP/C10bz 20/20 |
|---|---|---|---|---|---|---|---|
| Initial | [ | [ | [ | [ | [ | [ | [ |
| Yellow dye | ◯ | ◯ | ◯ | ◯ | ◯ | ◯ | [ |
| Pentel N50 black marker | ◯ | ◯ | ◯ | ◯ | ◯ | ◯ | [ |
| Dark tan shoe polish (Kiwi) | ▨ | ▨ | ▨ | ▨ | ▨ | ▨ | ▨ |
| Ball point Bic blue | [ | [ | [ | [ | [ | [ | [ |
| Ketchup | [ | [ | [ | [ | [ | [ | [ |

PLASTICISER COMPOSITIONS

CROSS REFERENCE TO RELATED APPLICATIONS

This application is a 371 National Stage Application of International Application No. PCT/EP2006/000478, filed Jan. 18, 2006, which claims the benefit of Provisional Application No. 60/645,161, filed Jan. 18, 2005, the disclosures of which are herein incorporated by reference in their entireties.

FIELD OF THE INVENTION

The present invention relates to improvements in or relating to plasticisers and to plasticised polyvinyl chloride compositions containing the plasticisers and in particular to polyvinyl chloride plastisols.

BACKGROUND OF THE INVENTION

When emulsion polyvinyl chloride and plasticiser are mixed a paste is typically formed which dries upon heating at temperatures above 160° C. to form a film. As the temperature is increased the polyvinyl chloride grains in the PVC composition begin to swell eventually forming a solid composition (dry film). This is known as the gelation temperature of the polyvinyl chloride composition and is typically in the range of 70° to 110° C. Fusion is the term that is used to describe the moment when the dry layer has developed its full mechanical or physical strength to form an integral article. The fusion temperature is typically in the range of 160° to 190° C.

The compositions are said to be useful in the manufacture of articles produced from conventional plastisol compositions including the manufacture of floor and wall coverings.

Polyvinyl chloride is available in two general forms known as suspension polyvinyl chloride and emulsion polyvinyl chloride according to their method of manufacture. Polyvinyl chloride that is used in plastisols, which are required to flow, is generally an emulsion polyvinyl chloride and this is typically used in the production of flooring and wall covering materials. Polyvinyl chlorides are classified as having a certain K value which is an indication of the mean molecular weight of the polymer. The higher the K value the better the mechanical properties like abrasion resistance of the polyvinyl chloride and the more useful the polyvinyl chloride in applications which are subject to abrasion such as in the top layer of flooring materials. However, the higher the K value of the polyvinyl chloride the slower the gelation rate, the higher the fusion temperature and the lower the flowability of the resin, which is undesirable for plastisol processing. Accordingly there is a need for fast gelling and fast fusing polyvinyl chloride compositions.

The properties required of a plasticiser vary according to the application in which the plasticised polyvinyl chloride composition is to be used. Typically this may be exemplified by the requirements of different layers in cushioned vinyl floor covering materials. The plastisol is spread on a surface moving at 15 to 25 meters per minute in several layers so that the floor covering is literally built up. Typically these layers include a glass matt impregnation layer, a foam core, a decorative layer and a clear protective surface wear layer. The multilayer products are first gelled by contact with a heated roll and then passed into an oven where they are fused at a temperature from 180° C. to 200° C. Often the gelling is performed after the spreading of each individual layer, starting with the base or encapsulation layer. The next layer cannot be applied until the previous layer has gelled. When all layers have been spread, the product is then passed into and through an oven to obtain full fusion of all layers and adequate expansion of the foamed layers.

To fulfil the plastisol spread coating requirements in terms of production speed, the PVC composition is required to be of low viscosity, exhibit a low gel temperature and a fast fusing rate.

In other applications such as the production of wall coverings, which typically consist of a compact foam layer on a paper backing, the machine speeds can be as high as 100 meters per minute and here the coating viscosity is important.

The presence of plasticisers tends to increase the susceptibility of the material to staining and hence it is desirable to minimise the amount of plasticisers present in the top coating to improve stain resistance and also to improve wearing properties.

However, as the plasticiser concentrations decrease, the viscosity of the paste PVC composition increases and it then becomes necessary to use increasing levels of viscosity depressants in the formulations in order to have the low viscosity required for the speed of the application. Stain resistance can also be improved by using faster-fusing plasticisers, which lead to a hardening effect on the surface of the finished product.

Despite the suggestion in WO 97/39060 that $C_{13}$ alkyl benzoates may be used as viscosity depressants, hydrocarbons have continued to be used as viscosity depressants, as have certain low molecular weight esters such as texanol isobutyrate (known as TXIB available from Eastman Chemical Co). The use of these materials suffers from the disadvantage that they are volatile and can release volatile organic compounds (VOC), which can impair the ambient air quality in terms of odours and pollutants both during processing and in finished product use. Increased awareness of the indoor environment has created a demand for low-emitting building materials as evidenced by the European Building and Construction Directive and in particular the European ENV 13419.

A further disadvantage of the use of viscosity depressants such as TXIB and hydrocarbon fluids is that they have little if any plasticising effect in polyvinyl chloride formulations and have the tendency to increase the gelation temperature. Viscosity depressants with little plasticising effect such as TXIB are too volatile to have much of a plasticising effect.

A further factor is the nature of the primary plasticisers that can be used in the top layer of flooring. For faster processing of the flooring top layer, it is desired to obtain plastisol compositions with low gelation temperature and fast gelation rate. It is the reason why speciality plasticisers such as diisoheptyl phthalate and butyl benzyl phthalate have been used in combination with general purpose plasticisers like di-2-ethyl hexyl phthalate or diisononyl phthalate. These special plasticisers are, however, expensive and it has recently been suggested that di-2-ethyl hexyl phthalate and butyl benzyl phthalate should be labelled Cat. 2 for their potential hazards as reproductive toxicants. It would therefore be highly desirable if conventional plasticisers such as di-2-propyl heptyl phthalate, diisononyl phthalate or diisodecyl phthalate could be used in the top layer of floor covering materials.

EP-A-1415978 suggests that benzoates produced from decanol mixtures derived from $C_4$ olefins can be used as viscosity-reducing and gel-accelerating softening agents to modify plastics such as polyvinyl chloride. The preferred benzoates consist of 50-99% 2-propyl heptyl benzoate and are said to have low volatility, good gelling capacity, good cold flexibilisation and low viscosity when used in plastics.

According to EP-A-1415978 the benzoates may be used with conventional plasticisers and Examples 1 to 6 of EP-A-1415978 show that the benzoates when mixed with Vestolit B 701 Polyvinyl Chloride emulsion and Vestinol 9 (diisononyl phthalate from Oxeno) produce plastisols that have comparable viscosity to those in which the benzoate is produced from the Exxal 10 alcohol available from ExxonMobil Chemical Company.

Example 7 of EP-A-1415978 compares the Tg of these two benzoates and suggests that the product based on 2-propyl heptanol may have improved low temperature performance. EP-A-1415978 therefore suggests to the person skilled in the art that Exxal 10 based benzoate is not suitable for the end-uses mentioned.

It has been the practice to use blends of different plasticisers and/or blends of plasticisers and viscosity depressants in order to obtain polyvinyl chloride plastisols with optimum properties. The formulator has sought to provide a plastisol which is fast-fusing and has a low viscosity combined with good staining performance whilst using as little plasticiser as possible to retain product stiffness (which is another important consideration in the production of vinyl floor covering). Consumers prefer stiffer products because this is often associated with higher quality.

In a layered composite material stiffness comes from the outside layer and total thickness. Furthermore, the formulator has sought to provide formulations that will yield products having improved flexibility. More recently, it has become important that the plastisols employed in such composites have a low volatility.

Traditionally, fast-fusing plasticisers have been used as plastisol components to increase the speed of fusing. Although these products have acceptable staining performance they are too volatile. If, however, they are used in combination with the less volatile bulk plasticisers such as diisononyl phthalate, the staining performance decreases (i.e. the staining is worse).

There therefore remains a need for plastisol compositions which are of low viscosity, have low volatility, have good staining performance, provide products with good low temperature flexibility and contain as little plasticiser as possible. In addition there is a requirement for a plastisol component for use with bulk plasticisers such as diisononyl phthalate to enable the bulk plasticiser to be used in applications where their reduced volatility would be of benefit providing they also have acceptable staining performance.

In addition there is a need for a plastisol component which not only functions to reduce the viscosity of the plastisol but also has a plasticising effect and furthermore does not increase the level of VOC's generated from articles produced from the plastisol.

There therefore remains the following needs for plasticised polyvinyl chloride compositions i) a low viscosity plasticiser which can function as a viscosity depressant for plasticised PVC formulations, which also has a plasticising effect and which offers good compatibility with PVC;

ii) a viscosity depressant whose volatility is acceptable while having little to no VOC contribution in emissions as measured by the Flec test;

iii) a viscosity depressant which is not detrimental to the susceptibility of articles made from the polyvinyl chloride composition to staining;

iv) a viscosity depressant which, when used results in a lower gelling temperature and faster fusing of the polyvinyl chloride composition;

v) a viscosity depressant which enhances the foaming rate of foamable polyvinyl chloride compositions;

vi) a viscosity depressant which will enable the use of $C_{9+}$ phthalates in applications where hitherto they have been less favoured or unacceptable because of their higher viscosity, poor gelation, and poor staining characteristics.

It is also important that any such material should not adversely impact other properties such as low temperature flexibility as measured by the Clash and Berg test.

SUMMARY OF THE INVENTION

We have found that $C_9$ to $C_{11}$ alkyl benzoates, due to their high boiling range (>290° C.) and low viscosity, will have very little contribution to the VOC's emitted from finished polyvinyl chloride products. In particular the $C_{10}$ alkyl benzoate with a boiling point above 315° C. can be incorporated into polyvinyl chloride compositions with no contributions to the VOC emissions in the finished product. The total VOCs, as measured by the Field and Laboratory Emission Cell (FLEC), are defined as the integrated detector response in toluene equivalents of compounds eluting between and including hexane (n-$C_6$) and hexadecane (n-$C_{16}$) (Europe standard) or octadecane (n$C_{18}$) (Norden countries [Norway, Sweden] standard). We have also found that $C_9$ to $C_{11}$ alkyl benzoates are particularly versatile when used as plasticisers and/or viscosity depressants in polyvinyl chloride formulations. We have found that the use of the alkyl benzoates brings benefits in a wide range of applications.

The present invention therefore provides a plasticiser of dynamic viscosity below 15 mPa·s at 20° C. with a boiling point higher than 300° C. that does not elute in the FLEC region as defined in the European ENV13419-3 standard nor in the Nordtest NT Build 438 standard.

We have found that $C_9$ to $C_{11}$ alkyl benzoates and in particular $C_{10}$ alkyl benzoates provide such a plasticiser which can be incorporated into polyvinyl chloride compositions and will also enhance the low temperature flexibility measured by the Clash and Berg test. We have also found that the use of a $C_{10}$ alkyl benzoate plasticiser in a 50/50 blend ratio with diisononyl phthalate, di-2-propyl heptyl phthalate or diisodecyl phthalate in a plastisol formulation containing 60 parts of plasticiser per 100 parts of polyvinyl chloride, lowers the Clash & Berg temperature by at least 9 degrees C. as compared with a formulation based entirely on the corresponding phthalate.

Thus, according to one embodiment of the present invention there is provided a plasticised polyvinyl chloride composition that does not elute in the FLEC region as defined in the European Env: 13419-3 standard comprising polyvinyl chloride and from 20 parts to 200 parts by weight of plasticiser per hundred parts by weight of polyvinyl chloride said plasticiser comprising a $C_9$ to $C_{11}$ alkyl benzoate.

BRIEF DESCRIPTION OF THE DRAWINGS

FIG. 7 shows the staining performance of samples made from various plastisols.

DETAILED DESCRIPTION

Figure 1:
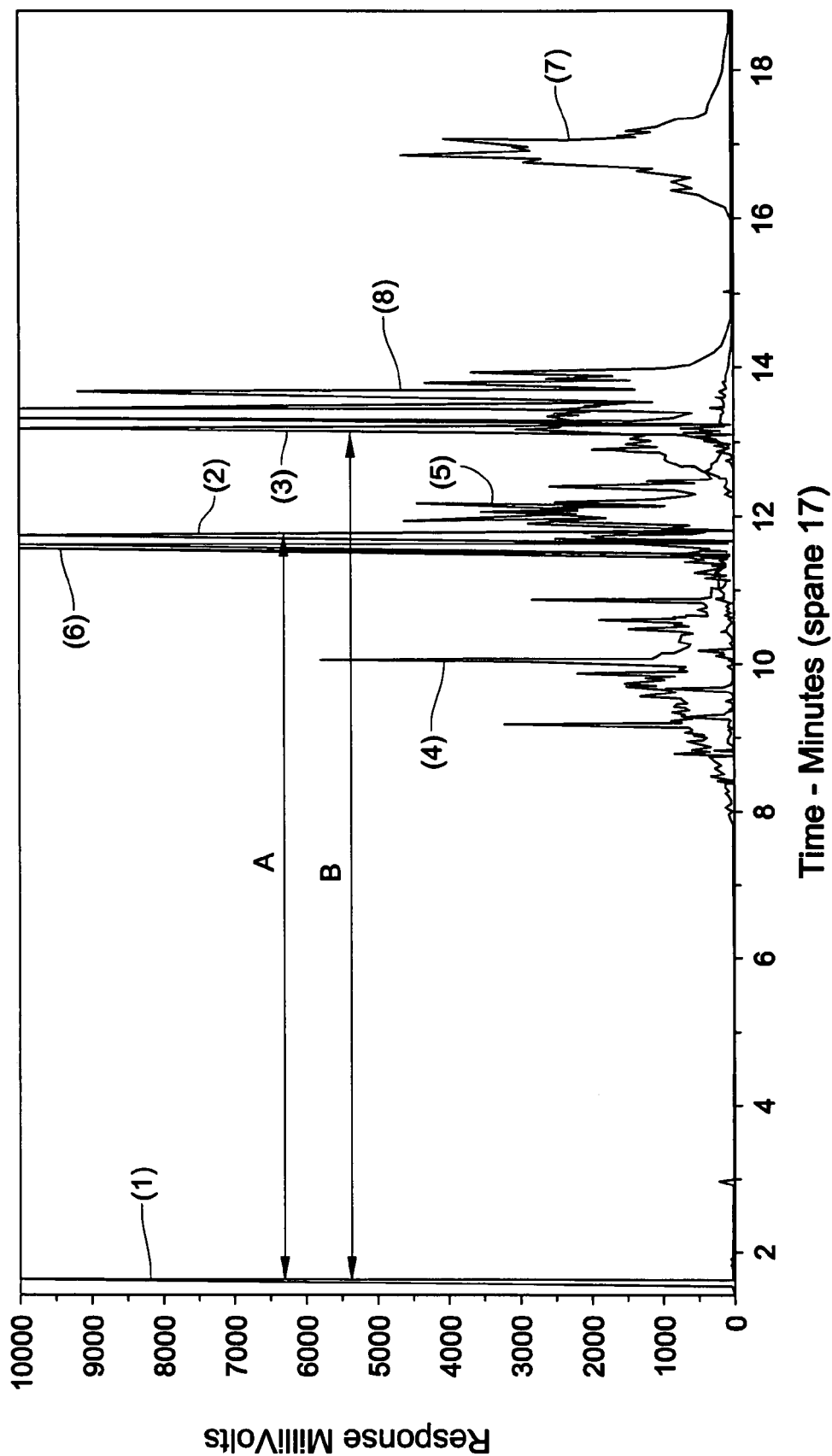
FIG. 1 shows the GC emissions of various materials used as viscosity depressants for plasticisers.
Figure 2A:
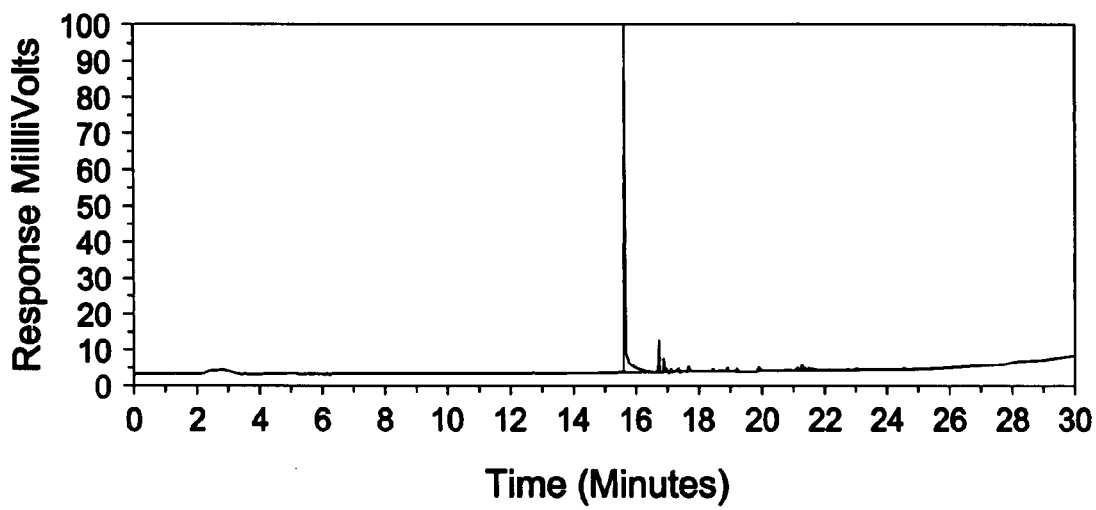
FIGS. 2A-2E demonstrate volatility of the $C_{10}$ alkyl benzoate in a flexible PVC formulation.
Figure 2B:
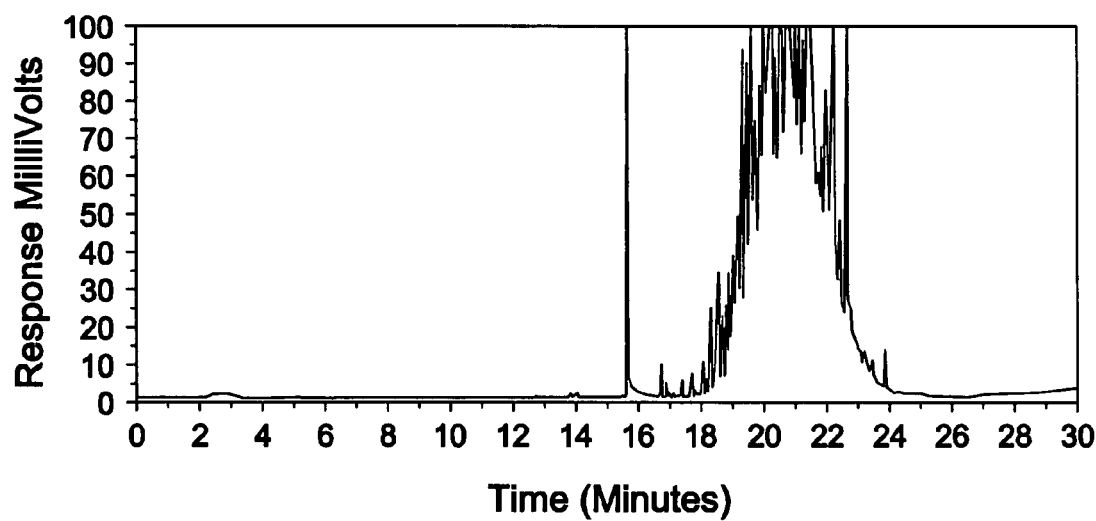
Figure 2C:
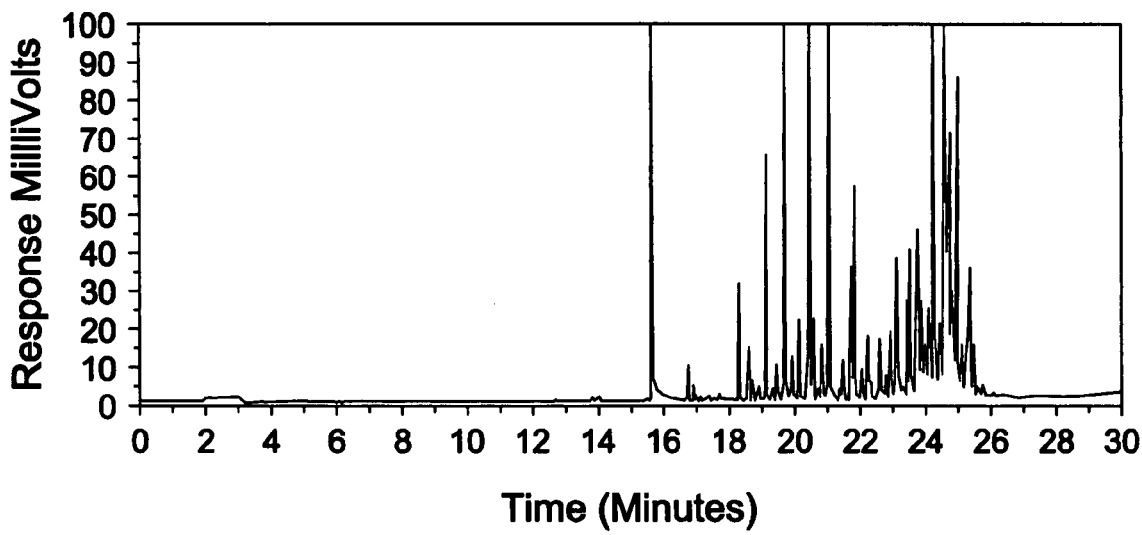
Figure 2D:
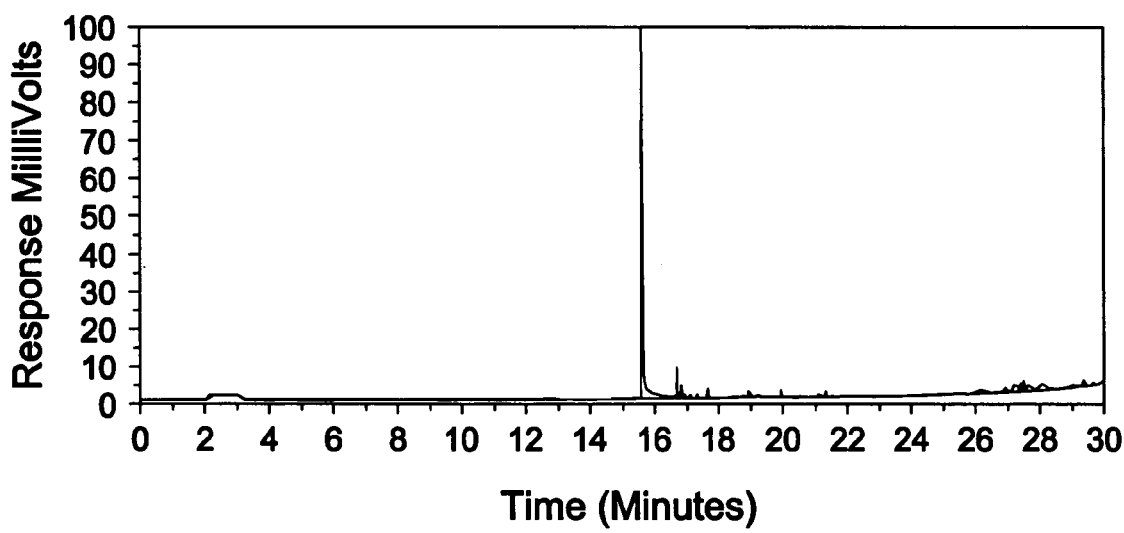
Figure 2E:
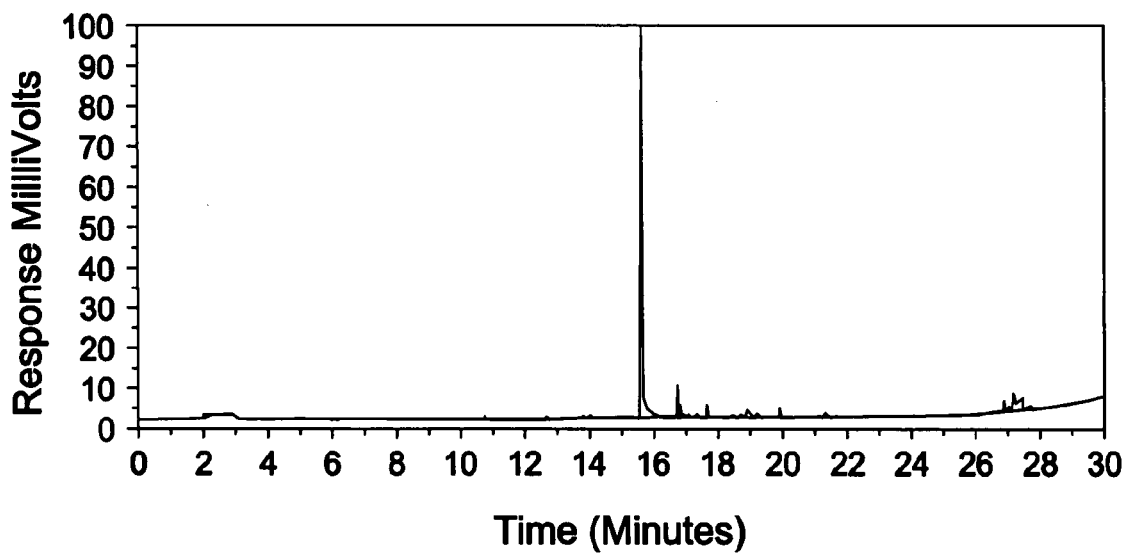

The total plasticiser content of the polyvinyl chloride (PVC) composition is made up of the $C_9$ benzoate and/or $C_{10}$ benzoate and/or $C_{11}$ benzoate and, if present, one or more plasticisers (termed herein "primary plasticisers") that are other than $C_9$-$C_{11}$ benzoate(s). Thus, according to the invention the total plasticiser content may be made up of one or more $C_9$-$C_{11}$ benzoates only, without primary plasticiser. However, it is preferred that the total plasticiser content also includes one or more primary plasticisers in addition to the one or more $C_9$-$C_{11}$ benzoates. Preferably the (total) plasticiser content of the PVC composition is from 20 to 150 parts by weight plasticiser per hundred parts by weight PVC (phr), more preferably 20 to 130 phr such as 40 to 130 phr, and most preferably 20 to 100 phr such as 40 to 100 phr. The particular proportions of $C_9$-$C_{11}$ benzoate, primary plasticiser and PVC in the composition are selected on the basis of the particular plasticisers used and the target properties required for the end PVC composition.

We have found that blending the $C_9$ to $C_{11}$ alkyl benzoate plasticiser with diisononyl phthalate, di-2-ethyl hexyl terephthalate, di-2-propyl heptyl phthalate or diisodecyl phthalate decreases the gelation temperature and reduces the Brookfield viscosity. For example we have found that when used in a 50:50 blend the gelation temperature can be decreased by at least 5 degrees C. and the Brookfield viscosity can be reduced by at least 60%. The lowering of the plastisol viscosity allows further reduction of the plasticiser content, which in turn can further reduce the gelation temperature by another 5 to 10 degrees C.

Together, these effects, the reduction in plasticiser content and the use of benzoate plasticisers according to the present invention, give a product with excellent processing characteristics of low viscosity, and low emissions with good stain and wear resistance. By using the benzoate plasticisers of the invention, it becomes much easier to formulate and obtain products that are intended for indoor use and that also do not elute in the FLEC region of the European ENV13419-3 standard and/or the Nordtest NT Build 438 standard.

The higher plasticising efficiency and lower viscosity of a $C_{10}$ alkyl benzoate in its use as a plasticiser compared with primary or general purpose plasticisers, such as di-2-ethyl hexyl phthalate, di-2-ethyl hexyl terephthalate, diisononyl phthalate, diisodecyl phthalate and di-2-propyl heptyl phthalate, allows further reductions of the plasticiser content of polyvinyl chloride compositions, especially in applications such as flooring top layers.

We have also found that the use of a $C_{10}$ alkyl benzyl benzoate as a plasticiser enables flexibility, measured according to hardness Shore A and D [ASTM D2240-2002], comparable with that achieved with formulations based on primary plasticiser alone (di-2-ethyl hexyl phthalate or diisononyl phthalate), with a reduction in parts of total plasticiser for 100 parts polyvinyl chloride of respectively 4% and 10%.

It should be understood that the current invention is concerned with levels of benzoate esters in a plasticiser mixture that will have a technical effect, i.e. above trace quantities. The invention is therefore concerned with compositions comprising at least 500 ppm by weight of C9 to C11 benzoates, relative to the total amount of plasticiser present in the mixture. Preferably the mixture contains at least 1000 ppm, more preferably at least 0.5% by weight, and even more preferably at least 1% by weight of C9 to C11 benzoates.

The invention is particularly useful in the production of multilayer floor coverings. The second layer in multilayer floor coverings is generally a foam decorative layer, which carries printing according to the desired appearance of the floor covering. The requirements of this layer are that a fast chemical foam blowing rate is achieved for which fast-fusing plastisols are required. Furthermore, a uniform foam structure is required for which an appropriate viscosity at the foaming temperature is required. The lower the foam density, the higher the volume produced and so the better from an economic point of view. It is therefore desirable to achieve the highest expansion rate possible, while keeping a good foam structure, at the processing temperature and speed which are set by the flooring curing oven and production line. Many other applications of polyvinyl chloride involve foaming which requires a low gel temperature, fast fusion of the plastisol and uniform foaming. A combination of these properties is difficult to achieve.

The foamable PVC paste composition should also have a low viscosity to enable rapid application. Although conventional hydrocarbon viscosity depressants continue to be used they do not aid gelation rate, foaming rate and foam quality. Moreover, the use of higher levels of viscosity depressants are detrimental to the foam quality. We have found that the use of the benzoates according to the present invention provides a low viscosity plasticiser system that aids in the formation of foam having desirable properties. Accordingly the present invention further provides the use of a $C_9$ to $C_{11}$ alkyl benzoate as a plasticiser in foam forming polyvinyl chloride formulations.

The remaining layers of vinyl flooring typically consist of a support layer such as a glass fibre membrane penetrated with an underlay which ensures that the flooring retains its dimensional stability. Finally a layer of back foam may be provided for sound and heat insulation and to provide springiness when articles such as tables and chairs are pressed into the flooring. With this layer a low foam density, fast foaming rate (therefore low gelation temperature and fast fusing) and low viscosity for ease of application are required. Once again conventional viscosity depressants are used in this layer.

Multilayer flooring material can also be produced by calendaring operations for which the plasticiser requirements can be widely different from those discussed above.

Other applications where the present invention is applicable include rotational moulding, injection moulding and extrusion and in each instance the polyvinyl chloride formulation has desired properties which are provided through the nature of the polyvinyl chloride, the choice of plasticiser and the use of processing aids. As an example, in extrusion or calendaring the low viscosity and faster fusing obtained by the use of the $C_9$ to $C_{11}$ alkyl benzoates would allow for shorter dry blending time for the formulation.

In one aspect, the compositions with which the present invention is concerned comprise polyvinyl chloride, a plasticiser other than a $C_9$ to $C_{11}$ alkyl benzoate and a $C_9$ to $C_{11}$ alkyl benzoate. In a preferred embodiment the $C_9$ to $C_{11}$ alkyl benzoate is a $C_9$ and/or $C_{10}$ alkyl benzoate and in a further preferred embodiment the $C_9$ to $C_{11}$ alkyl benzoate is a $C_{10}$ alkyl benzoate.

In yet a further preferred embodiment, the $C_9$ to $C_{11}$ alkyl benzoate contains at most 10% by weight $C_9$ alkyl benzoate, typically only incidentally present from the manufacturing process of the alcohol or due to the composition of the starting material thereof, preferably at most 8%, more preferably at most 6% by weight, based on the total amount of benzoates present. The $C_9$ alkyl benzoate content is desirably this low, since we have found that with such sufficiently low $C_9$ alkyl benzoate contents, the plasticiser or the composition containing the plasticiser will also not elute in the more stringent Nordtest NT Build 438 Standard. It will also reduce the volatile emissions from the composition over a longer period of time. For the same reasons, a higher content of $C_{11}$ alkyl benzoate may be preferred, such as at least 3% or 5%, preferably at least 15%, more preferably at least 30%, even more preferably at least 60%, most preferably at least 80% or even 90% by weight on the same basis. An advantageous $C_{11}$ alkyl benzoate may contain about 13% $C_{10}$, 81% $C_{11}$ and 6% $C_{12}$ alkyl benzoate. A $C_{11}$ alkyl benzoate may provide a higher safety margin in the emission tests mentioned above relative to a $C_{10}$ alkyl benzoate and even more relative to a $C_9$ alkyl benzoate. However, the $C_{11}$ alcohol is more difficult to make using the conventional oxo or hydroformylation process, due to the higher carbon number of the starting olefin resulting in a slower reaction rate. We therefore prefer to use the $C_{10}$ alkyl benzoate.

When the $C_9$ to $C_{11}$ alkyl benzoate is a $C_{10}$ alkyl benzoate, the level of $C_{10}$ alkyl benzoate is preferably at least 50%, more preferably at least 70%, even more preferably at least 80 or 85% or even 88% by weight, again on the same basis, and not more than 97%, preferably not more than 95, 93, 91 or 90% by weight. Such $C_{10}$ alkyl benzoate may further comprise at least 3% by weight, preferably at least 5%, and more preferably at least 6% by weight $C_{11}$ alkyl benzoate. An advantageous $C_{10}$ alkyl benzoate may contain about 4% wt $C_9$, 89% wt $C_{10}$ and 7% $C_{11}$ alkyl benzoate.

Within the family of possible $C_{10}$ alkyl benzoates, the benzoate derived from 2-propyl heptanol is more volatile than the equivalent mixture derived from nonene-based isodecyl alcohol. In a preferred embodiment, the $C_{10}$ alkyl benzoate of the invention is such that the alcohol obtained from hydrolysis of the benzoate of the invention contains less than 30%, preferably less than 20%, more preferably less than 10%, and even more preferably less than 8.5% by weight of 2-propyl heptanol. This brings the effect that the total volatile emissions from the product comprising the $C_{10}$ alkyl benzoate of the invention are lower, and that the physical characteristics of the end product as well as its visual aspects are maintained intact or acceptable over a longer period of time.

A further preferred embodiment of the present invention provides a polyvinyl chloride composition having a hot bench gelation temperature below 66° C. and a Brookfield viscosity at 20° C. below 2500 mPa·s without the requirement for viscosity depressants.

In a further preferred embodiment, the present invention provides a polyvinyl chloride composition, which at a concentration of at least 40 parts of $C_9$ to $C_{11}$ alkyl benzoate per 100 parts of polyvinyl chloride, has a Clash & Berg temperature of −25° C. or lower. This is considerably lower than, even 12° C. or more lower than a comparable composition based on pure di-2-ethyl hexyl phthalate or diisononyl phthalate.

In a further preferred embodiment the plastisol composition contains at least 20 parts by weight of $C_9$ to $C_{11}$ alkyl benzoate and a total plasticiser content of at least 40 parts per 100 parts of polyvinyl chloride. This has been found to result in a significant improvement of the stain resistance of articles produced from the formulation, particularly when the other plasticiser is di-2-ethyl hexyl phthalate, diisononyl phthalate, di-2-propyl heptyl phthalate, di-2-ethyl hexyl terephtalate or diisodecyl phthalate.

A further embodiment of the present invention comprises a plasticiser combination comprising a $C_9$ to $C_{11}$ alkyl benzoate and a $C_7$ to $C_{13}$ dialkyl phthalate and in particular di-2-ethyl hexyl phthalate, diisononyl phthalate, diisoheptyl phthalate, di-2-propyl heptyl phthalate, di-2-ethyl hexyl terephthalate or diisodecyl phthalate. In a further embodiment the composition comprises this plasticiser combination mixed with emulsion polyvinyl chloride. The K value (defined hereinafter) of the polyvinyl chloride is preferably greater than 60.

The composition of the invention not only provides a plastisol of low viscosity and low volatility but also provides additional unexpected benefits during processing and to the properties of articles fabricated from the composition. Where the $C_9$ to $C_{11}$ alkyl benzoate is used as a secondary plasticiser, the primary plasticiser(s) used in practice of the invention may be any of those conventionally used for plasticising chlorine containing resins. These include dialkyl esters of phthalic anhydrides with monohydric alcohols having from 4 to 13 carbon atoms, dibenzoate esters, alkyl esters of aliphatic dicarboxylic acid with monohydric alcohols having 3 to 10 carbon atoms such as adipates, and esters of cyclohexane dicarboxylic acids.

The mixture of primary plasticiser and $C_9$ to $C_{11}$ alkyl benzoate should be present in the plastisol at a concentration of above or at least 20 parts by weight of the mixture per 100 parts by weight of resin (phr). The concentration of the mixture is preferably in the range 40 to 100 phr. For some applications the concentration of the mixture may be considerably higher and as much as 130 phr or more may be used.

Useful improvements in properties, such as viscosity reduction, are achieved when the alkyl benzoate is present at a concentration of at least 10% by weight of the plasticiser mixture. Preferably, the $C_9$ to $C_{11}$ alkyl benzoate is present at a concentration of from 15 to 90% by weight of the mixture of primary plasticiser and $C_9$ to $C_{11}$ alkyl benzoate. Preferred compositions contain the $C_9$ to $C_{11}$ alkyl benzoate at a concentration of 40% to 60% by weight of the mixture of primary plasticiser and the alkyl benzoate.

The plastisols of the invention therefore provide an excellent balance of properties. In particular the properties are superior to the properties of compositions, which use conventional viscosity depressants. These properties include reduced volatility, a lower hot bench gelation temperature, improved compatibility (as evidenced by exudation) and a better balance of mechanical properties. The compositions of the invention are particularly useful when employed with blowing agents to produce foamed articles because the inclusion of the $C_9$ to $C_{11}$ alkyl benzoate gives rise to a high quality foam structure.

The present invention therefore provides improved polyvinyl chloride compositions.

Polyvinyl chloride is widely used in a variety of applications. Polyvinyl chloride is commonly used in a mixture with a plasticiser. The nature of the polyvinyl chloride, the nature of the plasticiser and the proportions of the two materials are chosen to provide a polyvinyl chloride composition having the desired properties for a particular application. Examples of the major uses of plasticised polyvinyl chloride compositions include wire and cable coating; other electrical applications such as plugs; film, foil and sheeting; flooring, wall covering; roofing; and membranes. Other uses include films such as stationery films, adhesive tapes and agricultural films. Polyvinyl chloride is also used in medical applications such as blood bags, tubing and bottle caps; further uses include footwear; pipe and guttering; and fabric coating.

Phthalate esters are widely used as plasticisers for polyvinyl chloride. Examples of phthalate esters that are used include diisobutyl phthalate, butyl benzyl phthalate, diisoheptyl phthalate, dioctyl phthalate, diisononyl phthalate, diisooctyl phthalate, diisoheptyl phthalate, di-2-ethyl hexyl phthalate (DEHP), diisononyl phthalate, di-2-propyl heptyl phthalate and diisodecyl phthalate. Typical commercial materials include the Jayflex plasticisers, Jayflex® 77 (DIHP), Jayflex® DINP and Jayflex® DIDP available from Exxon- Mobil Chemical and the Palatinol® plasticisers marketed by BASF and Vestinol® plasticisers from Oxeno.

The alcohols from which the plasticiser esters are made are generally obtained by either olefin oligomerisation followed by hydroformylation or by hydroformylation of olefins to form aldehydes followed by aldehyde dimerisation, generally by an aldol reaction. The alkyl groups of the esters therefore vary in size and structure according to the process and raw materials used to produce the alcohols. Typical plasticiser esters contain alkyl groups of 5 to 13 carbon atoms, particularly 7 to 13 carbon atoms, and have varying degrees of branching. The size and structure of the alkyl group helps determine the volatility and gelation temperature of the plasticiser and is therefore chosen according to the application in which the plasticised polyvinyl chloride is to be used. For example, in flooring applications stain resistance and low volatility (at least of the surface layer) is desirable and the alkyl group is selected accordingly.

The use of $C_9$ to $C_{11}$ benzoates according to the present invention is applicable across the range of plasticised polyvinyl chloride materials. It is applicable to the production of semi-rigid polyvinyl chloride compositions which typically contain from 10 to 40 parts, preferably 15 to 35 parts, more preferably 20 to 30 parts of plasticiser per 100 parts of polyvinyl chloride. The invention is also applicable to flexible polyvinyl chloride compositions which typically contain from 40 to 60 parts preferably 44 to 56 parts, more preferably from 48 to 52 parts per 100 parts of polyvinyl chloride. The parts mentioned herein are by weight. The invention is however particularly applicable to plastisols and especially plastisols used in the production of flooring and wall covering.

The semi-rigid compositions are typically used for the production of pipes, some wire and cable coatings, floor tiles, window shades, films, blood bags and medical tubing. Flexible compositions are typically used for the production of sheeting, upholstery, medical tubing, garden hoses, pool liners, water beds and the like. Very flexible compositions are used in the production of coated cloth, toys, shoe soles and the like.

One widespread use of polyvinyl chloride is as a plastisol. A plastisol is a fluid or a paste consisting of a mixture of polyvinyl chloride and a plasticiser optionally containing various additives. A plastisol is used to produce layers of polyvinyl chloride which are then fused to produce coherent articles of flexible polyvinyl chloride. Plastisols are useful in the production of flooring, tents, tarpaulins, coated fabrics such as automobile upholstery, in car underbody coatings, in mouldings and other consumer products. Plastisols are also used in medical uses such as blood bags and tubing, footwear, fabric coating, toys, flooring products and wallpaper. Plastisols typically contain 40 to 200 parts by weight, for example 70 to 120 parts by weight, or 90 to 150 parts by weight, more typically 40 to 60 parts by weight of plasticiser per 100 parts by weight of polyvinyl chloride.

Plastisols are usually made from polyvinyl chloride that has been produced by emulsion polymerisation or micro suspension polymerisation. The plastisol may be produced by the manufacturer of the polyvinyl chloride or a compounder and shipped to the user in fluid form. Alternatively the plastisol may be produced by the user. In either instance, although particularly when the plastisol is produced by the manufacturer of the polyvinyl chloride or a compounder, it is important that the plastisol viscosity be stable over time.

The compositions of the present invention have been found to fulfil the plastisol spread coating characteristics in terms of production speed (adequate viscosity and adequate gelation) that are typically required by industry.

The conventional (primary) plasticisers with which the $C_9$ to $C_{11}$ alkyl benzoates may be used according to the present invention are preferably alkyl orthophthalates such as dimethyl phthalate, diethyl phthalate, di-n-propyl phthalate, di-n-butyl phthalate, diisobutyl phthalate, monoglycol esters of phthalic acid, diglycol esters of phthalic acid, di-n-octyl phthalate, diisooctyl phthalate, di-2-ethyl hexyl phthalate, di-n-nonyl phthalate, diisononyl phthalate, di-n-decyl phthalate, diisodecyl phthalate, di-2-propyl heptyl phthalate, di-n-undecyl phthalate, diisoundecyl phthalate, diisododecyl phthalate, di-n-octadecyl phthalate, diisooctadecyl phthalate, di-n-eicosyl phthalate, dicyclohexyl phthalate; alkyl isophthalates such as, dimethyl isophthalate, diethyl isophthalate, di-n-butyl isophthalate, diisobutyl isophthalate, monoglycol esters of isophthalic acid, diglycol esters of isophthalic acid, di-n-octyl isophthalate, diisooctyl isophthalate, di-2-ethyl hexyl isophthalate, di-n-nonyl isophthalate, diisononyl isophthalate, di-n-decyl isophthalate, diisodecyl isophthalate, di-n-undecyl isophthalate, diisoundecyl isophthalate, diisododecyl isophthalate, di-n-octyl n-decyl isophthalate, di-n-eicosyl isophthalate, and or dicyclohexyl isophthalate; alkyl terephthalates such as n-butyl terephthalate, diisobutyl terephthalate, di-n-octyl terephthalate, diisooctyl terephthalate, di-2-ethyl hexyl terephthalate, di-n-nonyl terephthalate, diisononyl terephthalate, di-n-decyl terephthalate, diisodecyl terephthalate, di-2-propyl heptyl terephthalate, di-n-undecyl terephthalate, diisododecyl terephthalate, diisoundecyl terephthalate, di-n-octadecyl terephthalate, diisooctadecyl terephthalate, di-n-eicosyl terephthalate.

Further examples of commercial benzenepolycarboxylic acid esters which may be used with $C_9$ to $C_{11}$ alkyl benzoate(s) in accordance with the present invention include phthalates such as: Palatinol® AH (di-(2-ethyl hexyl)phthalate; Palatinol® AH L (di-(2-ethyl hexyl)phthalate); Palatinol® C (dibutyl phthalate); Palatinol® IC (diisobutyl phthalate); Palatinol® N (diisononyl phthalate); Palatinol® Z (diisodecyl phthalate) Palatinol® 10-P (di-(2-propyl heptyl) phthalate); Palatinol® 711P (heptyl undecyl phthalate); Palatinol® 911 (nonyl undecyl phthalate); Palatinol® 11P-E (diundecyl phthalate); Palatinol® M (dimethyl phthalate); Palatinol® A (diethyl phthalate); Palatinol® A (R) (diethyl phthalate); Palatinol® K (dibutylglycol phthalate), Jayflex 77, Jayflex DINP, Jayflex DIDP, Santicizer®261 ($C_7$-$C_9$ alkyl benzyl phthalate), Santicizer® 261A (benzyl isononyl phthalate), Benzoflex 2088® (di-benzoates) and Eastman® 168 (di-2-ethyl hexyl terephthalate). Further examples are the commercially available adipates such as: Plastomoll® DOA (di-(2-ethylhexyl) adipate) and Plastomoll® DNA (diisonyl adipate).

The $C_9$ to $C_{11}$ alkyl benzoate esters may be used in plastisol applications according to the present invention such as for wall coverings, flooring, toys, conveyor belts, synthetic leather. Typical formulations are, in parts by weight

| | |
|---|---:|
| PVC | 100 |
| $C_9$ to $C_{11}$ alkyl benzoate | 5-25 |
| Primary plasticiser | 20-50 |

Preferably such formulations additionally comprise, in parts by weight per hundred parts by weight PVC (pbw-phr):

| | |
|---|---:|
| Filler | 0-80 |
| Stabiliser | 1-4 |
| Other | 0-10 |

Typical formulations for use in the production of automotive underbody sealants which typically have high plasticiser and high filler contents are, in parts by weight

| | |
|---|---|
| PVC | 100 |
| $C_9$ to $C_{11}$ alkyl benzoate | 20-35 |
| Primary plasticiser | 60-90 |

Preferably such formulations additionally comprise, in pbw-phr:

| | |
|---|---|
| Filler (such as calcium carbonate) | 80-150 |
| Stabiliser and other additives | 0-10 |

As a further embodiment, preferred formulations for the production of calendered floor tiles are, in parts by weight

| | |
|---|---|
| PVC | 100 |
| $C_9$ to $C_{11}$ alkyl benzoate | 10-30 |
| Primary plasticiser | 20-30 |

Preferably such formulations additionally comprise, in pbw-phr:

| | |
|---|---|
| Epoxidized soybean oil | 0-6 |
| Filler (such as calcium carbonate) | 500-800 |
| Pigments, stabilisers, other additives | 0-10 |

As a further embodiment, preferred formulations for the production of stain resistant flooring top layers are, in parts by weight

| | |
|---|---|
| PVC | 100 |
| $C_9$ to $C_{11}$ alkyl benzoate | 10-20 |
| Primary plasticiser | 20-30 |

Preferably such formulations additionally comprise, in pbw-phr:

| | |
|---|---|
| Stabiliser | >0-3 |

As a further embodiment, preferred formulations for the production of glass fleece impregnation layers are, in parts by weight

| | |
|---|---|
| PVC | 100 |
| $C_9$ to $C_{11}$ alkyl benzoate | 10-40 |
| Primary plasticiser | 20-60 |

Preferably such formulations additionally comprise, in pbw-phr:

| | |
|---|---|
| Stabiliser | 0-3 |
| Filler (such as calcium carbonate) | 80-140 |

As a further embodiment, preferred formulations for the production of flooring decorative foam layers are, in parts by weight

| | |
|---|---|
| PVC | 100 |
| $C_9$ to $C_{11}$ alkyl benzoate | 10-20 |
| Primary plasticiser | 20-30 |

Preferably such formulations additionally comprise, in pbw-phr:

| | |
|---|---|
| Blowing agent | 1-4 |
| Stabiliser | 0-3 |
| TiO2 | 0-2 |

As a further embodiment, preferred formulations for the production of flooring back foam layers are, in parts by weight

| | |
|---|---|
| PVC | 100 |
| $C_9$ to $C_{11}$ alkyl benzoate | 10-30 |
| Primary plasticiser | 20-30 |

Preferably such formulations additionally comprise, in pbw-phr:

| | |
|---|---|
| Blowing agent | 0.2-4 |
| Stabiliser | 0-3 |
| TiO2 | 0-2 |

Thick extruded materials also benefit from the addition of the $C_9$ to $C_{11}$ alkyl benzoate as a fast-fusing plasticiser. Typical applications include thick chair mats, water stops, and extruded profiles. For applications where the extruded material may be thicker than 3-4 mm, if the plasticised PVC is not thoroughly mixed in the extruder, the surface is blemished, sometimes dull, sometimes containing mould marks, waves, or streaks. Adding a little $C_9$ to $C_{11}$ alkyl benzoate to the plasticiser blend can overcome this problem. Examples of suitable formulations for such extrusions, in parts per hundred, are

| | |
|---|---|
| PVC | 100 |
| $C_9$ to $C_{11}$ alkyl benzoate | 5-20 |
| Primary plasticiser | 15-30 |

Preferably such formulations additionally comprise, in pbw-phr:

| | |
|---|---|
| Filler | >0-25 |

In all of the above formulations, additives other than those mentioned may be included as needed (e.g., pigments, lubricants, stabilisers, other additives). By way of example only, they may be present in e.g. up to 10 or 20 pbw-phr.

We have found that, provided also the other ingredients of the formulations are selected appropriately, the above formulations containing the benzoates of the invention can be made such that the derived products that are intended for indoor use do not elute in the FLEC region of the European ENV13419-3 standard and/or the Nordtest NT Build 438 standard.

Reference to PVC in these formulations includes polyvinyl chloride, polyvinyl chloride copolymers and combinations of the two.

Polyvinyl chloride is available in many different forms— the variations being in the molecular weight of the polymer, the molecular weight distribution of the polymer, the particle size of the polymer particles, the particle size distribution and the surface aspect of the particles which may be coarse or smooth. Another variable in polyvinyl chloride is the degree of chain branching. The vinyl polymer may be a copolymer (e.g. a copolymer of vinyl chloride and vinyl acetate). Polymers of vinyl chloride may be obtained by suspension polymerisation or emulsion polymerisation, amongst other methods. In suspension polymerisation, vinyl chloride monomer is suspended in water with agitation under carefully controlled temperature and pressure. The batch will also contain suspending agents and initiators. After polymerisation is complete, the batch is discharged to a stripper where unreacted monomer is removed. Finally, the suspension is washed and dried to obtain the suspension polyvinyl chloride.

Typical suspension polymerised polyvinyl chloride consists of agglomerated particles of size in the range 80 to 200 µm. Polyvinyl chloride produced by suspension polymerisation is typically used in dry blend applications. Emulsion polymerised polyvinyl chloride is produced in a similar manner to suspension polyvinyl chloride except that the vinyl chloride monomer is emulsified in water so that the polymerisation results in latex particles. The ratio of water to vinyl chloride monomer in emulsion polymerisation is greater than the ratio of water to vinyl chloride monomer in suspension polymerisation. Emulsion polymerised polyvinyl chloride also consists of agglomerated particles but the particles are generally smaller than the particles of suspension polymerised polyvinyl chloride. Typically, the agglomerated particles of emulsion polyvinyl chloride have a particle size in the range of 15 to 20 µm. Emulsion polymerised polyvinyl chloride is generally used in the production of plastisols which are used in coating operations where the plastisol is coated onto a substrate and is then fused by heating.

Polyvinyl chloride of particle size between 1 and 40 µm may be produced by micro suspension polymerisation.

Different forms of polyvinyl chloride are used in different applications. One important property is the mean molecular weight of the polymer. A factor known as the K value is used to indicate the mean molecular weight of polyvinyl chloride. The K value is the viscosity of a 0.005 wt % solution of the polyvinyl chloride in cyclohexanone at 25° C. as measured using an Ubbelhode viscometer. The K value is typically determined according to the German standard DIN 53726. The K value of the polyvinyl chloride impacts the fusion temperature and gelation rate of the plasticised polyvinyl chloride composition. The K value also influences the melt viscosity of the plasticised polyvinyl chloride composition and the rate at which the composition can be foamed. Typically the higher the K value the better the mechanical properties but the lower the flowability. Accordingly, the formulator of polyvinyl chloride compositions will select the nature of the polyvinyl chloride and the nature of the plasticiser to optimise the properties for a particular use.

Where plasticised polyvinyl chloride is to be used in calendering operations, it is preferred to use a suspension polymerised polyvinyl chloride having a K value in the range 65 to 70. Where the plasticised polyvinyl chloride is to be used in wire and cable applications, it is preferred to use a suspension polymerised polyvinyl chloride having a K value above 70. For injection moulding, a polyvinyl chloride having a K value of 60 to 67 is preferred. Emulsion polymerised polyvinyl chloride is preferred for applications where good flow of the plasticised polyvinyl chloride is required such as spread coating, as used in the manufacture of flooring, chemical foaming, dip coating and rotational moulding. For spread coating an emulsion polyvinyl chloride of K value 65 to 75 is preferred and for chemical foaming, dip-coating and rotational moulding a K value of 65 to 70 is preferred.

The polyvinyl chloride and the plasticiser composition containing the $C_9$ to $C_{11}$ alkyl benzoate may be mixed by the conventional formulating techniques currently used in the production of plasticised polyvinyl chloride formulations. The formulator will attempt to provide a versatile composition having a good balance of properties at reasonable cost. The formulator will be concerned to optimise the balance between end-product properties such as flexibility, low temperature performance, flame resistance, high temperature resistance, volatility, stain resistance, electrical properties and processability and the processing properties such as plastisol viscosity, fusion, dry blending, emissions and printability.

The formulations containing the polyvinyl chloride and the plasticiser may contain other additives. The majority of formulations will contain a stabiliser which counters the effects of ageing; heat stabilisers also reduce the dehydrodehalogenation of the polyvinyl chloride at the temperatures at which the formulation is processed. Stabilisers such as benzotriazole and benzophenone will reduce the degradation by sunlight, ozone and biological agents. Typically, the formulations contain from 0.5 to 10 parts, normally from 1.5 to 3 parts, by weight of stabiliser per 100 parts by weight of the polyvinyl chloride.

Stabilisers to provide stability during heat processing are typically metal compounds, particularly lead salts, organotin compounds, barium, cadmium and zinc salts or calcium/zinc stabilisers. Organic phosphates and polyols may also be used. Lead stabilisers are used in wire and cable applications. Calcium/zinc stabiliser systems are used in wire and cable, foil and sheeting, wall coverings, medical applications, tubes and footwear, food packaging film and fabric coating. Barium/zinc stabiliser systems are used in foil and sheeting, flooring, wall covering, tubes and footwear and fabric coating. Tin stabilisers are used in flooring and wall covering. Zinc compounds are frequently used as a stabiliser and as a kicker in formulations used to produce foams in, for example, flooring, wall covering and fabric coating.

Other ingredients which may be added to the polyvinyl chloride formulations include fillers such as calcium carbonate, titanium dioxide or silica. When used, the filler may typically be present in an amount up to 150 parts by weight, preferably up to 100 parts per 100 parts by weight of polyvinyl chloride. Lubricants, pigments and processing acids may be included. Other ingredients will be chosen according to the use to which the formulation is to be put. For example, the formulation may contain flame retardants, blowing agents and kickers, bio-stabilisers, antistatic agents, viscosity regulators such as thickeners and thinners, antifogging agents which are particular useful is packaging films and antioxidants, such as bisphenol A.

Fillers are incorporated in the formulations to reduce cost, increase the output of dry blending, increase electrical resistance, increase resistance to ultra-violet light, increase hardness, produce improved heat transmission, increase the resistance to heat deformation. Fillers can also impart anti-blocking or anti-slip performance. Examples of suitable fillers include calcium carbonate, and clays such as aluminosilicates, silica, dolomite and bauxite.

The particular particle size distribution and average surface area of the filler will be chosen according to the properties it is desired to impart.

Lubricants and processing aids may be included to reduce the adhesion between polyvinyl chloride and hot machinery surfaces during processing. The lubricants also affect the frictional properties between resin particles during processing. Examples of lubricants include stearic acid and metal stearates, which can also act as stabilisers.

The following test methods are used in the examples of the present invention.

Hot Bench Gelation Temperature

The Hot Bench Gelation Temperature (HBG) is the temperature at which a well defined plastisol layer forms a gel. HBG is measured on a metal gel block having a temperature gradient similar to a Geigy graded temperature gel block.

A small quantity of plastisol is poured on the cold end of the block and drawn as a film along the length of the block. A stop-watch is started as soon as the film is drawn. After 60 seconds a strip of Mylar foil is laid over the plastisol film. The Mylar foil is removed and the point where no plastisol is adhering to the foil is marked. The temperature at the mark is recorded as the "HBG temperature".

Brookfield Viscosity

ASTM D 1824 (2002)—Standard test method for apparent viscosity of plastisols and organosols at low shear rates by Brookfield viscometer. Use of spindle RV 1 to 7.

Fusion Temperature

ASTM D 4005—Standard Test Method for Plastic-Coated Fabrics—Completeness of Fusion of PVC Dispersion Coatings Low Temperature Flexibility Clash & Berg measurement—ASTM D 1043-84 Stiffness properties of plastics as a function of temperature by means of a torsion test Plasticising Effect—Efficiency Factor—Hardness ASTM D 2240-2002: Standard test method for rubber—Durometer Hardness Staining A staining substance is applied to the surface of a film for a specified time. After this time the substance remaining free on the surface is removed and the degree of staining is visually evaluated. Films are prepared and conditioned for 24 hours at room temperature. A drop of the staining agent (for example Yellow Dye, pencil, marker, shoe polish, lipstick, mustard, ketchup) is left on the test sample for 24 hours. After 24 hours, the free stain agent is removed with water (for water-based stains) or hexane and the residual stain is observed.

The present invention is illustrated by reference to the following examples.

In the Tables, the various components mentioned are as follows:

| | |
|---|---|
| Vestolit P1414K80 = | an emulsion PVC available from Vinnolit GmbH. |
| Jayflex 77 or J77 = | diisoheptyl phthalate available from ExxonMobil Chemical Company (EMCC). |
| Exxsol D100 and D140 = | dearomatized hydrocarbon fluids available from EMCC. |
| OTS 45 = | a tin stabiliser available from Akcros Chemicals GmbH. |
| TXIB = | texanol isobutyrate available from Eastman Chemical Company. |
| DDB = | dodecyl benzene |
| BYK 5050 or Viscobyk 5050 = | a low volatile carboxylic acid derivative (viscosity depressant available from Velsicol Corporation). |
| DIBP = | di iso butyl phthalate (Palatinol IC available from BASF) |
| DINP = | di iso nonyl phthalate (Jayflex DINP from ExxonMobil Chemical) |
| C10Bz = | C10 alkyl benzoate. |
| C11Bz = | C11 alkyl benzoate. |
| C13Bz = | C13 alkyl benzoate. |
| Benzoflex 2088 or B2088 = | a benzoate ester available from Velsicol Corporation. [Believed to be obtained by esterification of a mixture of di-ethylene glycol, tri-ethylene glycol and di-Propylene glycol with benzoic acid]. |
| Jayflex DINP or J-DINP = | di isononyl phthalate available from EMCC. |
| Vestolit P1415K80 = | an emulsion PVC available from Vinnolit. |
| Vinnolit C66W = | a PVC extender resin available from Vinnolit. |
| Palatinol IC = | di isobutyl phthalate available from BASF. |
| Baerostab OM695 = | a stabilizer available from Baerlocher. |
| Calcilit C16 = | calcium carbonate available from Omya. |
| BBP = | benzyl butyl phthalate (Santicizer 261 available from Ferro) |
| Solvic 380NS = | emulsion PVC available from Solvay |
| Vinnolit C100V = | emulsion PVC available from Vinnolit |
| Tinstab 295 = | a tin stabiliser available from Akcros Chemicals GmbH. |
| Vinnolit 4472 = | an emulsion PVC available from Vinnolit. |
| Palatinol AH = | 2-ethyl hexyl phthalate available from BASF. |
| Vinnolit P1361K = | an emulsion PVC available from Vinnolit. |
| Vinnolit C65V = | a suspension of PVC, used as extender resin for paste making, available from Vinnolit. |
| Microdol A250 and A325 = | calcium carbonate available from Norwegian Talc Company. |
| Porafor ADC/MC1 = | azodicarbonamide blowing agent available from Bayer Corporation. |
| Kronos 220 = | titanium dioxide available from Fitzchem Corporation. |
| LZK 561 = | stabiliser available from Lankromark. |
| Vinnolit E68CF = | an emulsion PVC available from Vinnolit. |
| Solvic 367NC = | an emulsion PVC available from Solvay. |
| Genitron LE = | azodicarbonamide blowing agent, containing a kicker, available from Bayer AG. |

The above benzoates, labeled as C10Bz, C11Bz and C13Bz respectively, were obtained by conventional lab esterification of commercial benzoic acid obtained as flakes from DSM, available under the tradename PUROX® B, with respectively Exxal® 10, Exxal® 11 and Exxal® 13 alcohols, which are commercial alcohol mixtures available from ExxonMobil Chemical.

In the drawings, FIG. 1 shows the GC emissions of various materials used as viscosity depressants for plasticisers. The current European Standard of the FLEC test is indicated on the Figure as "A", as is the stricter NORD Test ("B") which is currently applied in Scandinavia. A covers the range between the peaks for n-hexane (1) and n-hexadecane (2). B covers the range between the peaks for (1) and n-octadecane (3). FIG. 1 also shows the peaks for Exxsol D100 (4), DDB (5), TXIB (6), Jayflex 77 (7) and C10 Bz (8). FIG. 1 shows the benefit of the reduced volatility of the $C_{10}$ alkyl benzoate as compared to the typical viscosity depressants included in this test.

In the drawings, FIGS. 3-6 and 8-11 show the property values of various formulations by means of bar charts. In each such chart the order of the bars (from left to right) corresponds with the formulation key associated with that chart, in the same left to right order.

emission spectra of V2 and V4, a small amount of C10 benzoate can be noticed at retention times of around 27-28 minutes, and the amount stays low, even at the higher concentration of V4.

Table 2 shows the viscosity of some typical plasticiser and viscosity depressants used in plastisol formulations.

TABLE 2

|  | Exxsol D100 | Exxsol D140 | TXIB | DDB | BYK 5050 | DIBP | C10Bz | C11Bz | C13Bz | Benzoflex 2088 | J77 | J-DINP |
|---|---|---|---|---|---|---|---|---|---|---|---|---|
| Viscosity (mPa·s at 20° C.) | 3 (1) | 7 (1) | 7 | 9 | 18 | 41 | 10 | 15 | 20 | 71 (3) | 51 | 95 |
| Density (g/cm3 at 20° C.) | 0.819 (2) | 0.836 (2) | 0.946 | 0.86 | 0.953 | 1.039 | 0.953 | 0.951 | 0.943 | 1.06 | 0.991 | 0.972 |

(1) measured at 25° C.
(2) measured at 15° C.
(3) measured at 25° C.

The graphs shown in FIGS. 2A-2E demonstrate further benefits of the reduced volatility of the $C_{10}$ alkyl benzoate in a flexible PVC formulation such as that used in the production of a flooring top layer.

The formulations used were as shown in Table 1.

TABLE 1

| Ingredients | Ref | V1 | V2 | V3 | V4 |
|---|---|---|---|---|---|
| Vestolit P1415 K80 | 100 | 100 | 100 | 100 | 100 |
| Jayflex 77 | 50 | 40 | 40 | 40 | 25 |
| Exxsol D100 |  | 10 |  |  |  |
| $C_{10}Bz$ |  |  | 10 |  | 25 |
| DDB |  |  |  | 10 |  |
| OTS 45 | 2.5 | 2.5 | 2.5 | 2.5 | 2.5 |

Films were produced of initial thickness of about 0.4 mm and heated in a Werner Mathys oven for 2 min at 180° C./2300 rpm (oven air circulation). The fused films were wrapped in aluminum foil after cooling.

Headspace Gas Chromatography was used to examine the volatile components emitted by the films. Test materials were pre-conditioned at 80° C. for 30 minutes in a sealed container to achieve equilibrium of the head-space. Aliquots of the gas phase above the sample were then analyzed by capillary GC. The GC column used was an apolar column traded under the name Ultra 2 from J&W Scientific, with a length of 50 m, an internal diameter of 0.32 mm and coated with a methylpolysiloxane film having a film thickness of 0.52 µm. The GC oven temperature was kept at 50° C. for 5 minutes, and was then raised to 300° C. over a period of ten minutes, hence at a rate of 25° C./minute. The retention time of normal hexadecane on this column and in this method is around 25.5-26 minutes.

Above headspace conditions have been shown to be a useful starting point for the evaluation of VOC emissions from PVC sheets. Where the flexible PVC films are identified by this technique as having very low levels of volatiles, i.e. when only very small peaks show up in the GC spectrum, subsequent analysis of such films with the FLEC test has also exhibited good results.

Results set out in FIGS. 2A-2E show that flexible PVC formulations using C10 alkyl benzoate as a replacement for traditional viscosity depressants (V2 and V4 emission spectra) exhibit extremely low levels of VOC. In these Figures, the vertical axis reflects response in units of millivolts; and the horizontal axis indicates GC retention time in minutes. In the

EXAMPLE 1

The effect on viscosity and gelation of using a $C_{10}$ alkyl benzoate as a secondary plasticiser was compared with that of using diisobutyl phthalate as the secondary plasticiser and a similar product formulated with no secondary plasticiser. The formulation based on the $C_{10}$ alkyl benzoate does not contain any viscosity depressants. The formulations were as shown in Table 3.

TABLE 3

| Ingredients | Ref | T1 | T2 |
|---|---|---|---|
| Vestolit P1415 K80 | 80 | 80 | 80 |
| Vinnolit C66 W | 20 | 20 | 20 |
| Jayflex DINP | 40 | 24 | 20 |
| Palatinol IC |  | 20 |  |
| $C_{10}Bz$ |  |  | 20 |
| DDB | 9 |  |  |
| Viscobyk 5050 |  | 5 |  |
| Baerostab OM 695 | 2 | 2 | 2 |

Figure 3:
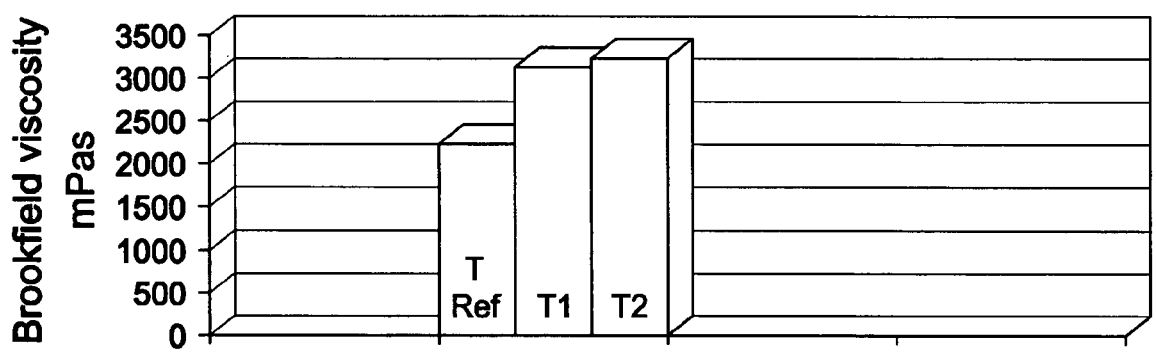
FIGS. 3-6 show the properties of various formulations by means of bar charts.
Figure 4:
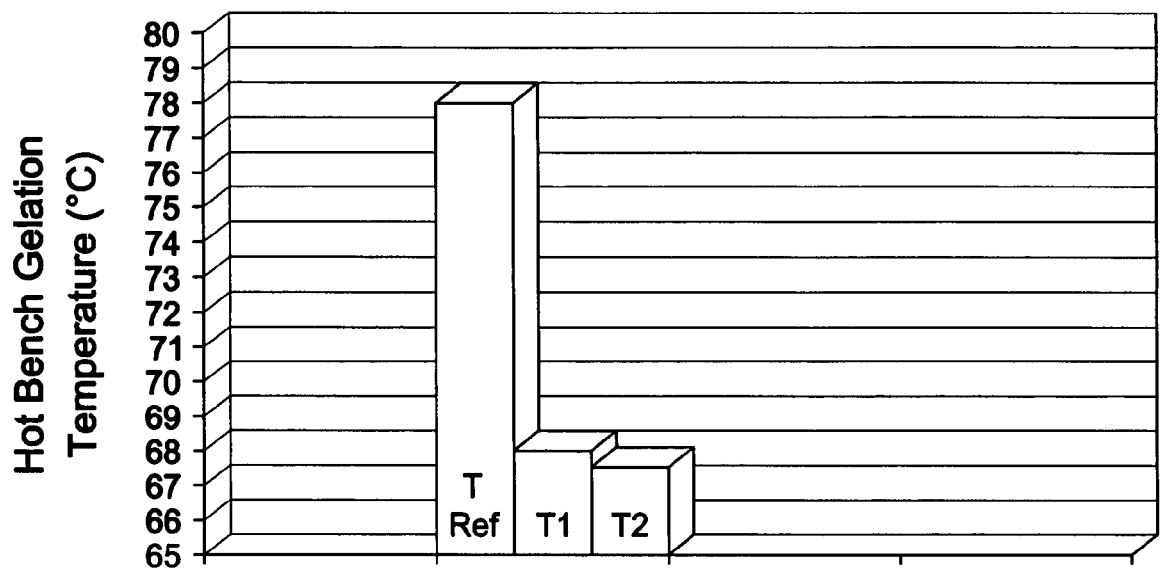

The results are shown in FIGS. 3 and 4. The results illustrate that formulation T2, although it contains no viscodepressant, achieves rheology and gelation performances that are similar to the other formulations that contain a viscodepressant.

The effect was also compared in the formulation shown in Table 4, which contained a filler. Again, the formulation based on the $C_{10}$ alkyl benzoate does not contain any viscosity depressants.

TABLE 4

| Ingredients | Ref | T1 | T2 |
|---|---|---|---|
| Vestolit P1415 K80 | 80 | 80 | 80 |
| Vinnolit C66 W | 20 | 20 | 20 |
| DINP | 75 | 65 | 55 |
| DiBP |  | 10 |  |
| C10 Bz |  |  | 20 |
| DDB | 9 |  |  |
| Viscobyk 5050 |  | 5 |  |

TABLE 4-continued

| Ingredients | Ref | T1 | T2 |
|---|---|---|---|
| Calcilit C16 | 80 | 80 | 80 |
| Baerostab OM 695 | 2 | 2 | 2 |

Figure 5:
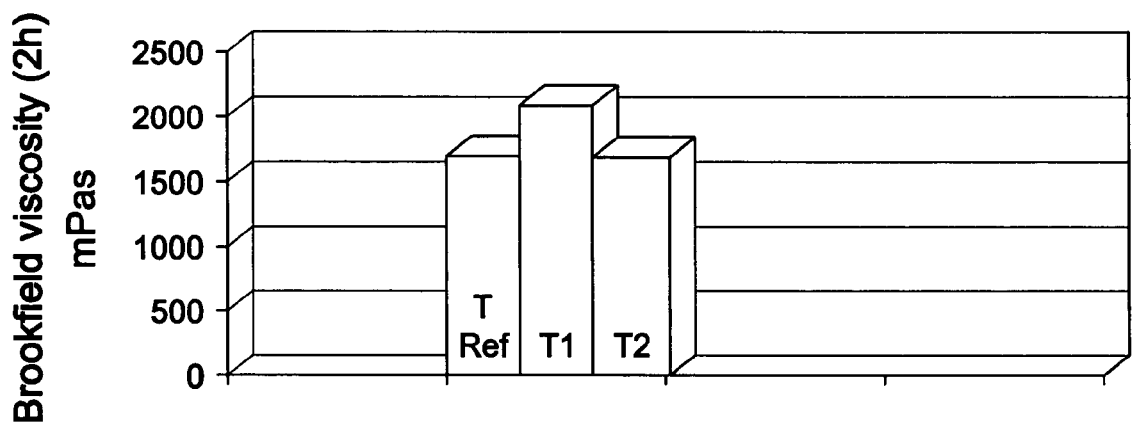
Figure 6:
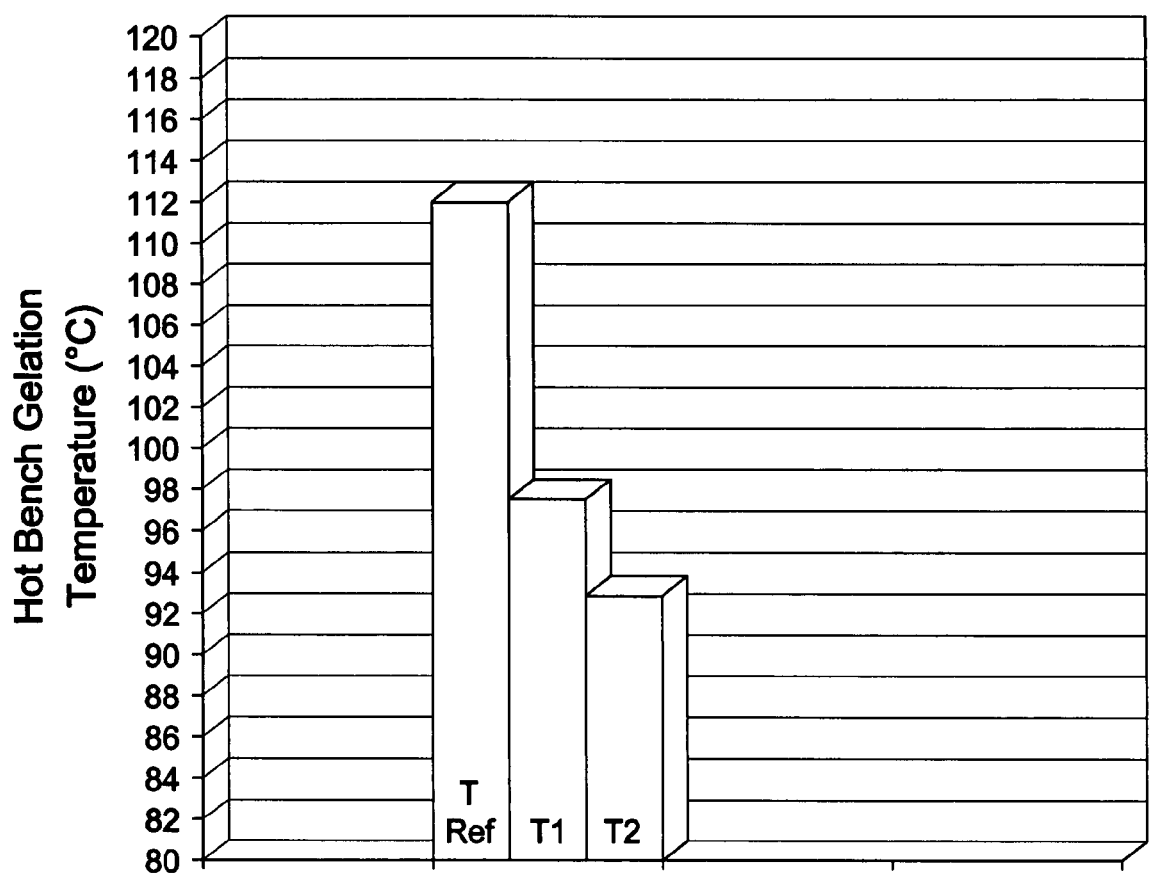

The results are shown in FIGS. 5 and 6.

EXAMPLE 2

The relative staining performance of samples made from various plastisols was evaluated and the results are shown in FIG. 7, which designates the samples as F0-F6.

The formulations used are shown in Table 5.

TABLE 5

| Ingredients | Phr |
|---|---|
| Solvic 380 NS | 70 |
| Vinnolit C100 V | 30 |
| Plasticiser, the amount and nature of which is shown in FIG. 7 | |
| Tinstab 295 | 1 |

Inspection of FIG. 7 shows that in each case where a staining material has been applied, F6 (according to the invention) exhibits much lower staining than comparison formulations F0-F5. This is readily apparent from the black and white version of FIG. 7 as contained in this specification; and is even more clearly shown in the colour version of FIG. 7, not contained in this specification. The improvement derived from use of C10 Bz (F6) is particularly great where the staining material is yellow dye, Pental N50 black marker and Dark tan shoe polish.

F6 will be noted to contain less total plasticiser than F0-F5, but was selected for comparison purposes because it has substantially the same plastisol viscosity as F0-F5. This was because in industry, rheology is generally the decisive parameter for the manufacturer. Thus the low viscosity of the C10 Bz employed according to the invention facilitates plastisols of the viscosity required by industry which also have much improved stain resistance. Even in cases where formulations of the invention contain total plasticiser levels the same as in F0-F5, such formulations still show considerably improved stain resistance compared with F0-F5.

EXAMPLE 3

The formulations, shown in Table 6, were evaluated for low temperature performance in the Clash and Berg Test and for hardness.

TABLE 6

| Ingredients | E1 | E2 | E3 | E4 | E5 |
|---|---|---|---|---|---|
| Vinnolit 4472 | 100 | 100 | 100 | 100 | 100 |
| DiBP | 40 | | | | |
| C10 Bz | | 40 | | | |
| Palatinol AH | | | 40 | | |
| Jayflex 77 | | | | 40 | |
| DINP | | | | | 40 |
| Tinstab 295 | 1 | 1 | 1 | 1 | 1 |

Figure 8:
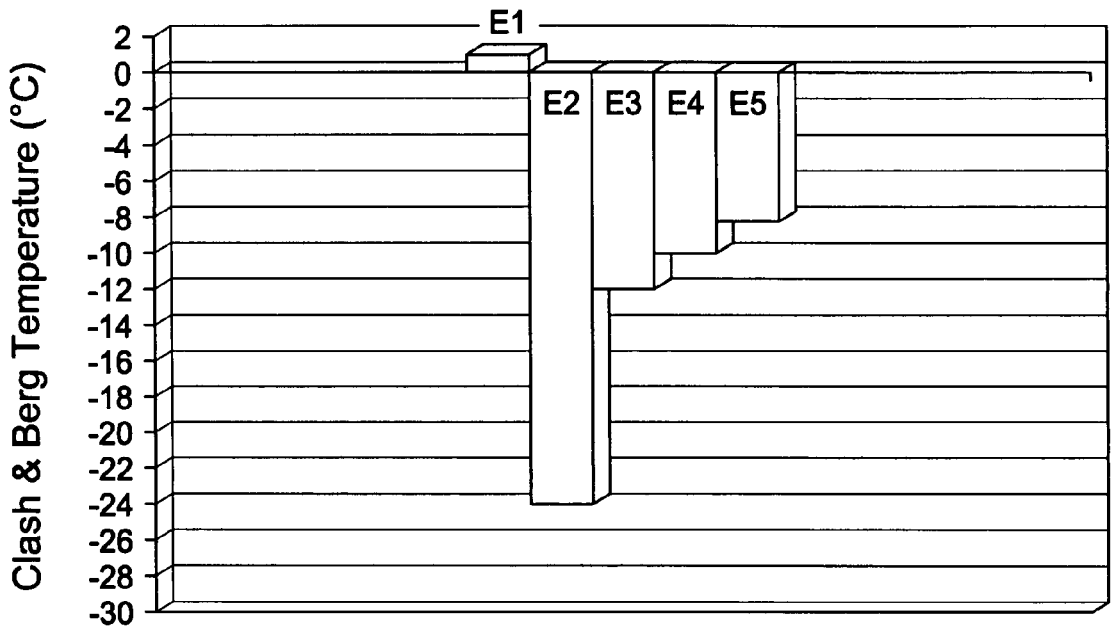
FIGS. 8-11 show the properties of various formulations by means of bar charts.
Figure 9:
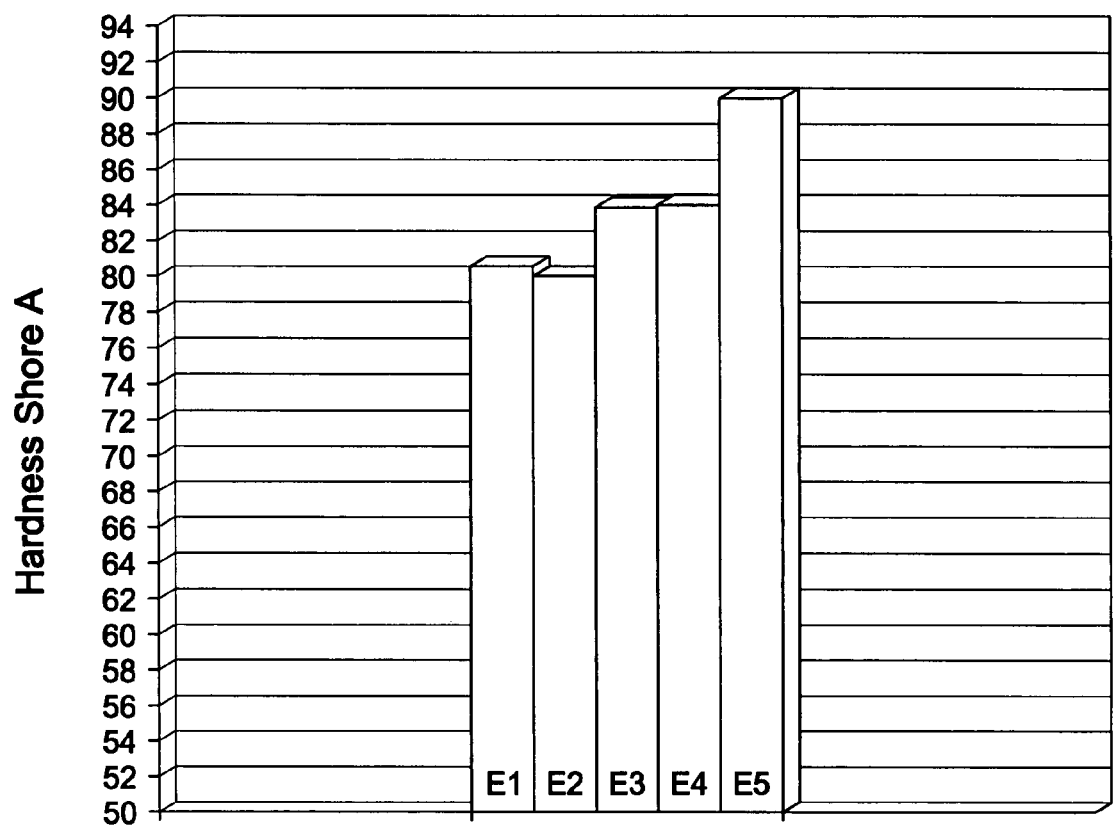

The Clash and Berg results are shown in FIG. 8 and the hardness results are shown in FIG. 9.

EXAMPLE 4

The effect on hot bench gelation temperature of varying amounts of the $C_{10}$ alkyl benzoate in the formulations, shown in Table 7, based on the diheptyl phthalate Jayflex 77 (J77) was evaluated.

TABLE 7

| Ingredients | Ref | F | G | H | I | J |
|---|---|---|---|---|---|---|
| Vinnolit P1415 K80 | 100 | 100 | 100 | 100 | 100 | 100 |
| J77 | 50 | 40 | 35 | 30 | 25 | 20 |
| C10 Bz | | 10 | 15 | 20 | 15 | 20 |
| Tinstab 295 | 1 | 1 | 1 | 1 | 1 | 1 |

Figure 10:
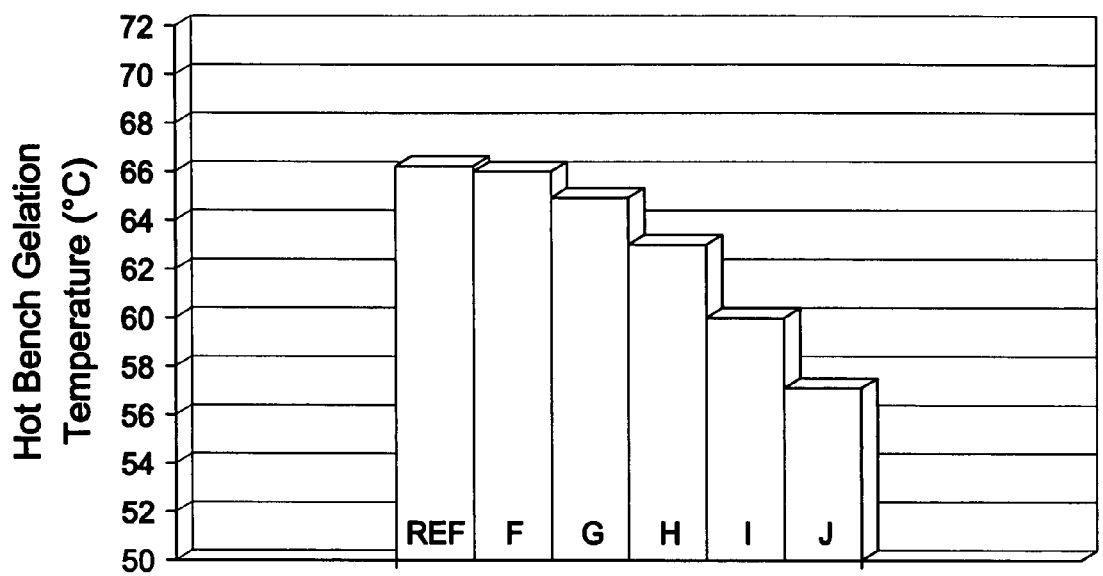

The results are shown in FIG. 10.

The effect in a similar formulation based on the plasticiser diisononyl phthalate (Jayflex DINP) was also evaluated. The formulations used were as shown in Table 8.

TABLE 8

| Ingredients | REF | A | B | C | D | E |
|---|---|---|---|---|---|---|
| Vinnolit P1415 K80 | 100 | 100 | 100 | 100 | 100 | 100 |
| DINP | 50 | 40 | 35 | 30 | 25 | 20 |
| C10 Bz | | 10 | 15 | 20 | 15 | 20 |
| Tinstab 295 | 1 | 1 | 1 | 1 | 1 | 1 |

Figure 11:
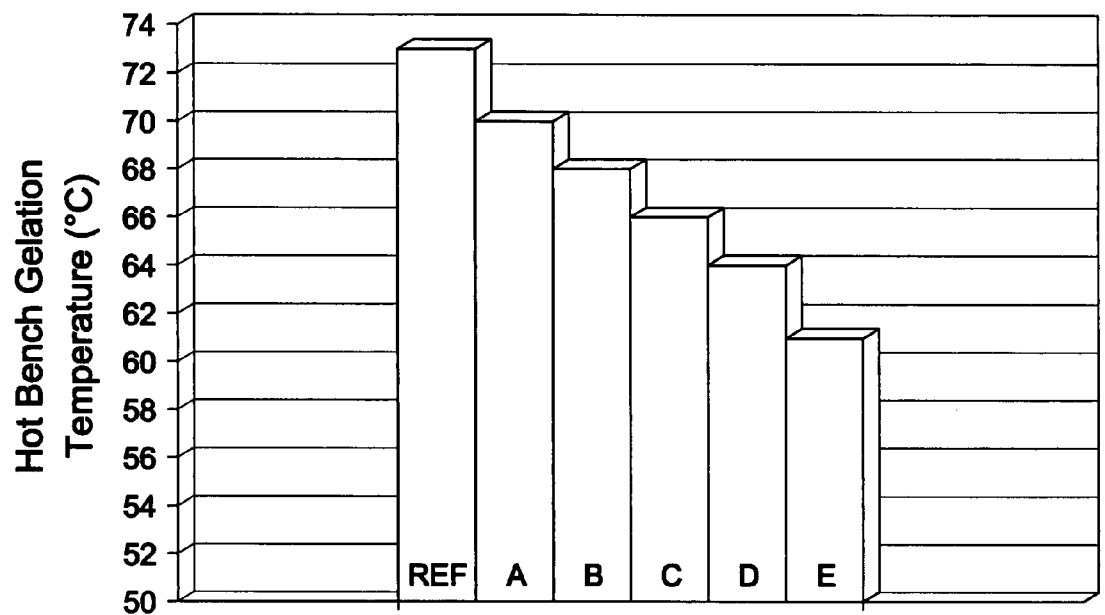

The results are shown in FIG. 11.

FIGS. 10 and 11 show that use of C10 Bz according to the invention gives improved gelation both for formulations containing fast-fusing J77 as primary plasticiser and for formulations containing slower-fusing DINP as primary plasticiser. Indeed, formulations containing DINP/C10 Bz can give gelation properties that are better than formulations containing fast-fusing J77 as the sole plasticiser.

EXAMPLE 5

The effect of varying amounts of the $C_{10}$ alkyl benzoate on foamed plastisols was evaluated on the formulations based on the diisononyl phthalate (Jayflex DINP) as shown in Table 9.

TABLE 9

| Ingredients | Ref | K10 | K20 |
|---|---|---|---|
| Vinnolit P1361 K | 70 | 70 | 70 |
| Vinnolit C65 V | 30 | 30 | 30 |
| DINP | 60 | 50 | 40 |
| $C_{10}$Bz | | 10 | 20 |
| Microdol A325 | 60 | 60 | 60 |
| Porofor ADC/M-C1 | 4 | 4 | 4 |
| Kronos 220 | 1.5 | 1.5 | 1.5 |
| LZK 561 | 2 | 2 | 2 |

A film of initial thickness about 0.4 mm was subjected to fusion in a Werner Mathys oven for 2 min 30 sec at 180° C. The expansion rate, measured as the ratio of the film thickness before and after fusion is shown in Table 10:

TABLE 10

| | Ref | K10 | K20 |
|---|---|---|---|
| Expansion ratio | 3 | 3.8 | 4.8 |

The data in Table 10 show the improvement in expansion ratio obtained when the $C_{10}$ alkyl benzoate is incorporated into the formulation.

EXAMPLE 6

The affect of varying amounts of the $C_{10}$ alkyl benzoate on foamed plastisols, using a fast kickered chemical blowing agent, was evaluated on formulations, shown in Table 11, based on the diisononyl phthalate (DINP):

TABLE 11

| Ingredients | Ref | L20 | L30 |
|---|---|---|---|
| Vinnolit E68CF | 60 | 60 | 60 |
| SOLVIC 367 NC | 40 | 40 | 40 |
| DINP | 60 | 40 | 30 |
| C10 Bz |  | 20 | 30 |
| Microdol A250 | 40 | 40 | 40 |
| Genitron LE | 3 | 3 | 3 |
| Kronos 220 | 2 | 2 | 2 |

A film of initial thickness about 0.4 mm was subjected to fusion in a Werner Mathys oven for 1 min 30 sec at 180° C. The Brookfield viscosity, measured after 2 hours, is shown in Table 12:

TABLE 12

|  | Ref | L20 | L30 |
|---|---|---|---|
| Viscosity in mPas | 19450 | 9240 | 7330 |

The expansion rate, measured as the ratio of the film thickness before and after fusion, is shown in Table 13:

TABLE 13

|  | Ref | L20 | L30 |
|---|---|---|---|
| Expansion ratio | 3 | 3.6 | 3.9 |

The invention claimed is:

1. A plastisol comprising polyvinyl chloride and from 20 parts to 200 parts by weight of plasticizer per hundred parts by weight of polyvinyl chloride, said plasticiser comprising a primary plasticizer selected from dialkyl esters of phthalic anhydrides with monohydric alcohols having from 4 to 13 carbon atoms, dibenzoate esters, alkyl esters of aliphatic dicarboxylic acid with monohydric alcohols having 3 to 10 carbon atoms, esters of cyclohexane dicarboxylic acids, and mixtures thereof, and a secondary plasticiser including at least one $C_{10}$ alkyl benzoate with the proviso that said $C_{10}$ alkyl benzoate is characterized such that the $C_{10}$ alcohol obtained by hydrolysis of said benzoate contains less than 30 wt % 2-propyl heptanol wherein said secondary plasticizer further comprises $C_9$ and $C_{11}$ alkyl benzoate but no more than 10 wt % of said $C_9$ alkyl benzoate.

2. The plastisol according to claim 1, wherein said primary plasticizer is selected from the group consisting of diisononyl phthalate, di-2-ethyl hexyl terephthalate, di-2-propyl heptyl phthalate and diisodecyl phthalate.

3. The plastisol of claim 1, further characterized by at least one of:
 (i) decreased Hot bench gelation temperature (HBG);
 (ii) reduced Brookfield viscosity (ASTM D1824-2002);
 (iii) increased plasticizing effect (ASTM D2240-2002)
relative to a plastisol comprising the same proportion of polyvinyl chloride and plasticizer without said secondary plastizer.

4. The plastisol according to claim 1, further comprising at least 40 parts by weight of said at least one $C_{10}$ alkyl benzoate per 100 parts by weight of polyvinyl chloride and having a Clash & Berg temperature of −25° C. or lower.

5. The plastisol according to claim 1, in which the polyvinyl chloride has a K value greater than 60.

6. The plastisol according to claim 1, wherein alkyl benzoate is present in the amount of 15 to 90% by weight of the plasticiser component of the composition.

7. The plastisol according to claim 1, wherein alkyl benzoate is present in the amount of 40-60% by weight of the plasticiser component of the composition.

8. The plastisol according to claim 1, further comprising a blowing agent.

9. Flooring comprising at least one layer made from a plastisol, said plastisol comprising polyvinyl chloride and from 20 parts to 200 parts by weight of plasticiser per hundred parts by weight of said polyvinyl chloride, said plasticiser comprising at least one secondary plasticizer selected from $C_9$-$C_{11}$ alkyl benzoates and at least one primary plasticizer selected from dialkyl esters of phthalic anhydrides with monohydric alcohols having from 4 to 13 carbon atoms, dibenzoate esters, alkyl esters of aliphatic dicarboxylic acid with monohydric alcohols having 3 to 10 carbon atoms, and esters of cyclohexane dicarboxylic acids with the proviso that said C10 alkyl benzoate is characterized such that the C10 alcohol obtained by hydrolysis of said benzoate contains less than 30 wt % 2-propyl heptanol wherein said secondary plasticizer further comprises $C_9$ and $C_{11}$ alkyl benzoate but no more than 10 wt % of said $C_9$ alkyl benzoate.

10. The flooring according to claim 9, wherein said plastisol is characterized as having from 20 parts to 150 parts by weight of plasticiser per hundred parts by weight of polyvinyl chloride, said secondary plasticiser comprising at least one $C_{10}$ alkyl benzoate and at least one primary plasticizer selected from the group consisting of diisononyl phthalate, di-2-ethyl hexyl terephthalate, di-2-propyl heptyl phthalate and diisodecyl phthalate.

11. The flooring according to claim 9, comprising at least one $C_{10}$ benzoate and wherein said plastisol is further characterized by at least one of:
 (i) decreased Hot bench gelation temperature (HBG);
 (ii) reduced Brookfield viscosity (ASTM D1824-2002);
 (iii) plasticizing effect (ASTM D2240-2002)
relative to a plastisol comprising the same proportion of polyvinyl chloride and plasticizer without said at least one $C_{10}$ alkyl benzoate.

12. The flooring according to claim 9, wherein said plastisol is further characterized as comprising at least 40 parts by weight of said at least one $C_{10}$ alkyl benzoate per 100 parts by weight of polyvinyl chloride and having a Clash & Berg temperature of −25° C. or lower.

13. The flooring according to claim 9, wherein said polyvinyl chloride has a K value greater than 60.

14. The flooring according to claim 9, wherein alkyl benzoate is present in the amount of 15 to 90% by weight of the plasticiser component of the composition.

15. The flooring according to claim 9, wherein alkyl benzoate is present in the amount of 40-60% by weight of the plasticiser component of the composition.

16. The flooring according to claim 9, further comprising a blowing agent.

* * * * *